US012609059B2

(12) United States Patent
Dibartolo

(10) Patent No.: US 12,609,059 B2
(45) Date of Patent: Apr. 21, 2026

(54) ELECTRICAL COVER WITH INDICATOR

(71) Applicant: Frank Dibartolo, North Haledon, NJ (US)

(72) Inventor: Frank Dibartolo, North Haledon, NJ (US)

( * ) Notice: Subject to any disclaimer, the term of this patent is extended or adjusted under 35 U.S.C. 154(b) by 0 days.

(21) Appl. No.: 19/082,243

(22) Filed: Mar. 18, 2025

(65) Prior Publication Data

US 2025/0218316 A1 Jul. 3, 2025

Related U.S. Application Data

(63) Continuation-in-part of application No. 29/917,353, filed on Nov. 20, 2023.

(51) Int. Cl.
*G09F 23/00* (2006.01)

(52) U.S. Cl.
CPC .................................... *G09F 23/00* (2013.01)

(58) Field of Classification Search
CPC ....................................................... G09F 23/00
See application file for complete search history.

(56) References Cited

U.S. PATENT DOCUMENTS

| | | | | |
|---|---|---|---|---|
| 5,075,686 | A * | 12/1991 | Shigemura | H04N 1/00384 341/23 |
| 5,212,899 | A * | 5/1993 | Fandreyer | G09F 3/20 40/661.11 |
| 5,594,206 | A * | 1/1997 | Klas | H01H 9/18 174/67 |
| 5,693,911 | A * | 12/1997 | Sydow | H05K 5/0252 283/117 |
| 6,642,452 | B2 * | 11/2003 | Masson | H02G 3/14 174/67 |
| 10,475,596 | B2 * | 11/2019 | Dimberg | H01H 3/02 |
| 2003/0042038 | A1 * | 3/2003 | Masson | H02G 3/14 174/66 |
| 2003/0165653 | A1 * | 9/2003 | Morrison | B32B 7/06 283/81 |
| 2005/0207136 | A1 * | 9/2005 | Jasper | H01H 9/182 362/253 |
| 2005/0242569 | A1 * | 11/2005 | Morrison | G09F 7/12 283/81 |
| 2005/0274538 | A1 * | 12/2005 | Gretz | H02G 3/14 174/67 |
| 2006/0016809 | A1 * | 1/2006 | Dinh | H02G 3/14 220/835 |

(Continued)

*Primary Examiner* — Timothy J Thompson
*Assistant Examiner* — Rhadames Alonzo Miller
(74) *Attorney, Agent, or Firm* — Tatonetti IP

(57) ABSTRACT

A light switch cover is implemented in which users can attach, view, and easily replace labels indicating the function of a given switch. A front cover includes a window through which the label is visible, and an indent on its rear side accommodates a mounting plate, a clear film, and a sticker. Tabs on the mounting plate engage notches in the front cover's indent, creating a press-fit mechanism that allows quick removal or replacement of labels without unscrewing or detaching the entire cover. The rear cover, which is screwed to the wall, is concealed by the front cover for a sleek, screw-less appearance. Alternatively, the same labeling concept can be implemented using a single-face plate that houses the window and mounting arrangement.

4 Claims, 7 Drawing Sheets

(56) References Cited

U.S. PATENT DOCUMENTS

| | | | | |
|---|---|---|---|---|
| 2009/0211779 A1* | 8/2009 | Drane | H02G 3/14 | 174/67 |
| 2010/0058638 A1* | 3/2010 | Askin | H01H 9/18 | 40/661 |
| 2010/0097781 A1* | 4/2010 | Combs | G09F 13/04 | 362/95 |
| 2010/0181091 A1* | 7/2010 | Drane | H02G 3/14 | 174/66 |
| 2012/0048590 A1* | 3/2012 | Drane | H02G 3/14 | 174/67 |
| 2012/0180349 A1* | 7/2012 | Ekins | H01R 13/465 | 361/807 |
| 2013/0148323 A1* | 6/2013 | Yang | H01H 9/161 | 200/314 |
| 2014/0262418 A1* | 9/2014 | Korcz | H02G 3/088 | 174/67 |
| 2015/0279243 A1* | 10/2015 | Willes | G09F 3/10 | 428/137 |
| 2020/0028340 A1* | 1/2020 | Calvert | H02G 3/081 | |
| 2023/0264398 A1* | 8/2023 | Green | B29C 45/14688 | 40/574 |

* cited by examiner

ELECTRICAL COVER WITH INDICATOR

CROSS-REFERENCES TO RELATED APPLICATIONS

This Non-Provisional Patent Application claims the benefit of and priority to U.S. Provisional Patent Application Ser. No. 29/917,353, filed Nov. 20, 2023, entitled "Light Switch Cover," the entire contents of which are hereby incorporated herein by reference.

BACKGROUND

In many homes and buildings, light switches have purposes that are unclear or completely unknown to occupants. These "mystery switches" can create confusion or frustration, as people might flip them repeatedly without seeing any effect.

SUMMARY

A light switch cover is implemented in which users can attach, view, and easily replace labels indicating the function of a given switch. A front cover includes a window through which the label is visible, and an indent on its rear side accommodates a mounting plate, a clear film, and a sticker. Tabs on the mounting plate engage notches in the front cover's indent, creating a press-fit mechanism that allows quick removal or replacement of labels without unscrewing or detaching the entire cover. The rear cover, which is screwed to the wall, is concealed by the front cover for a sleek, screw-less appearance. Alternatively, the same labeling concept can be implemented using a single-face plate that houses the window and mounting arrangement.

In another embodiment, a paddle switch can directly incorporate the mounting plate and label using double-sided tape. The tape is sized for the switch's surface, allowing the mounting plate, label, and protective film to attach securely. When the label needs updating, the user removes or covers the old sticker with a new one. These configurations can be adapted to various switch types or face plates, offering flexibility in materials (e.g., plastic, PET, PVC) and how the label is protected (with or without a clear film). The overall system facilitates a clean aesthetic, straightforward access, and greater clarity for identifying switch functions.

BRIEF DESCRIPTION OF THE DRAWINGS

Like reference numerals indicate like elements in the drawings. Elements are not drawn to scale unless otherwise indicated.

DETAILED DESCRIPTION

Figure 1:
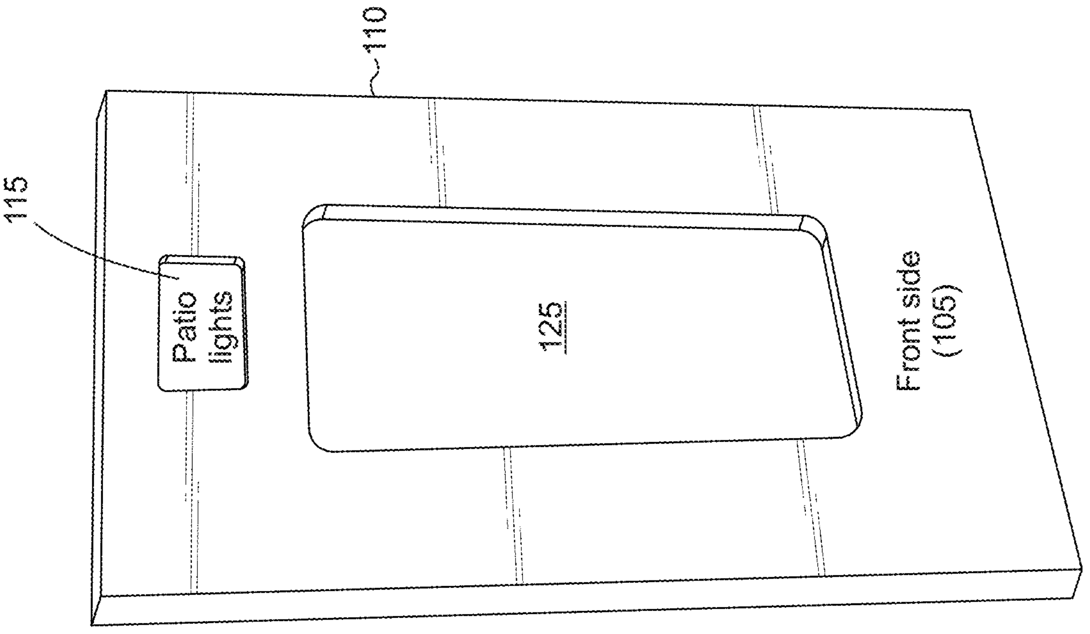
FIG. 1 shows an illustrative representation of a light switch cover's front side with a window.
Figure 2:
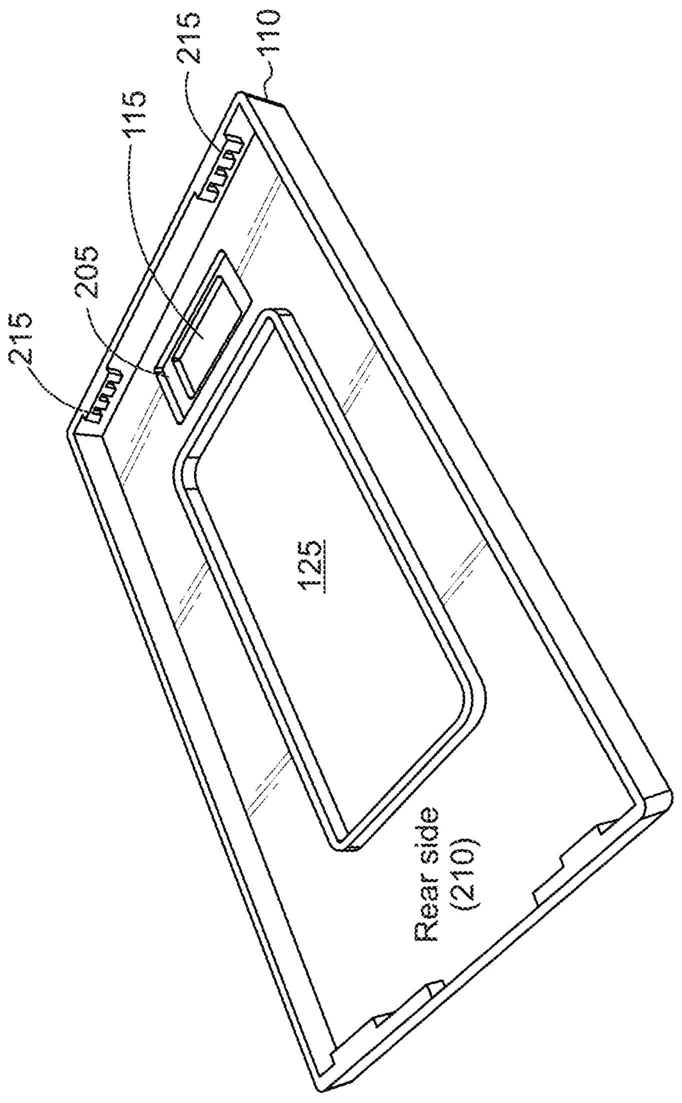
FIG. 2 shows an illustrative representation of the light switch cover's rear side.

FIGS. 1 and 2 show illustrative representations in which a front light switch cover 110 is configured with an open and hollow window 115, enabling a user to label the specific switch with some insignia indicator. For example, there is no telling what a light switch controls until it is used, and even then, the user may not know what to look for. The light switch 110 includes the window 115 so the user can see a label that describes the light's functions from the front side 105. The opening 125 is for the switch itself (not shown), such as a paddle switch in this example. Referring to the rear side 210, the light switch's window 115 includes an indent 205 into which a label can fit. The tabs 130 may be used to secure the light switch to its rear cover.

Figure 3:
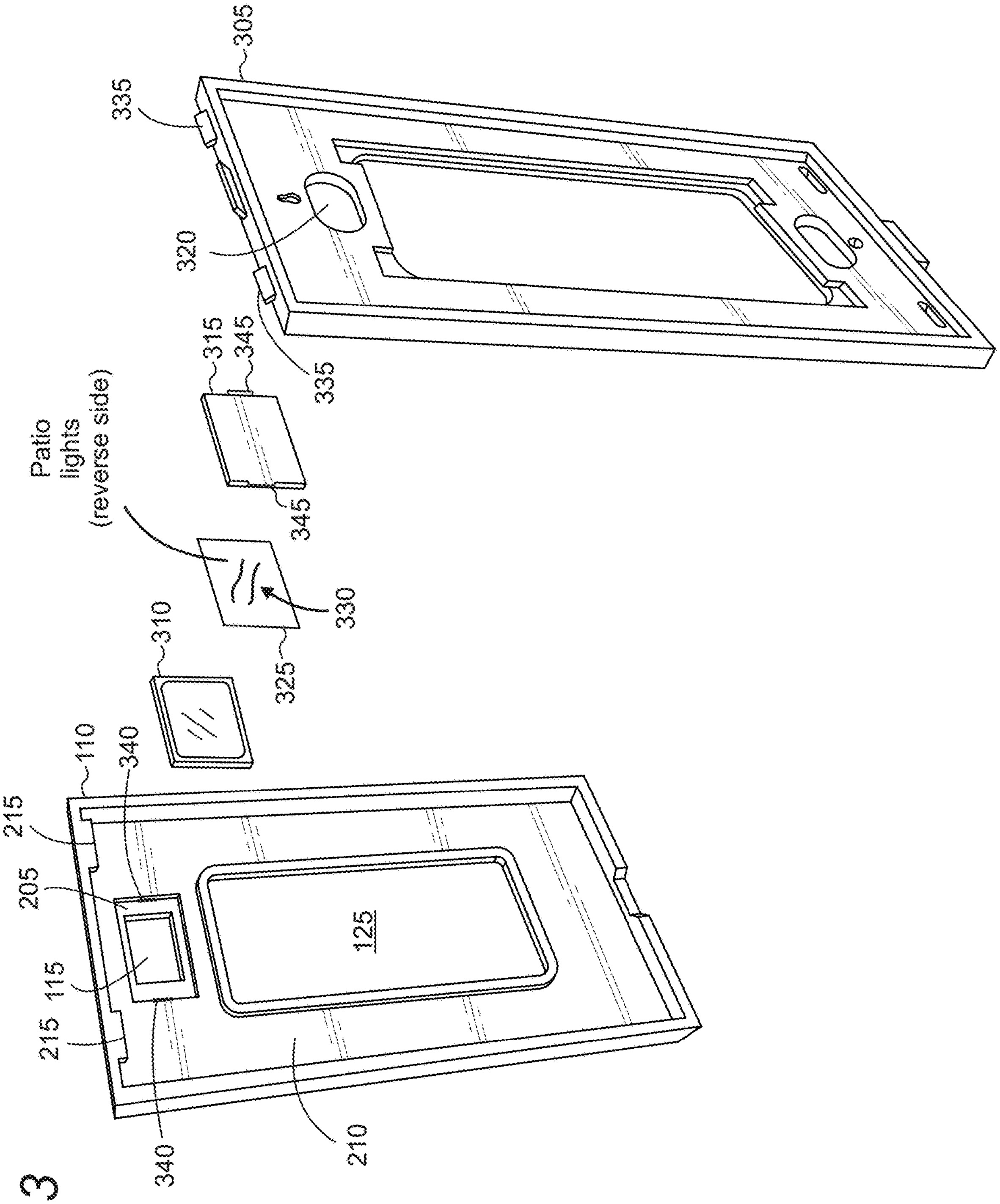
FIG. 3 shows an illustrative exploded representation of the light switch cover.

FIG. 3 shows an illustrative representation in which the front light switch cover 110 can secure to a rear cover 305 that may be screwed to a wall. In this regard, the front light switch cover is adapted to be a "screwless" cover so that the screws that attach the rear plate 305 to the wall are hidden. The front cover can press-fit to the rear cover to make the light switch more appealing by hiding the screws in the rear plate. The front cover 110 includes tabs 215 overlapping and press-fit against the rear plate's opposing tabs 335 to lock the plates together.

The light switch cover's rear side 210 includes an indent 205 surrounding the window 115. The indent includes notches 340 that tabs 345 on mounting plate 315 engage and press-fit into. Specifically, a sticker or label 330 attaches to the front side of the mounting plate, and then the mounting plate with the attached sticker secures to the rear side of the clear film 310 and locks the arrangement into indent 205. The mounting plate may contact at least a portion of the clear film, as the sticker sits at least partially in between the mounting plate and film such that the sticker contacts both components simultaneously. The sticker includes adhesive 330 to attach to the mounting plate. The front side 105 of the light switch cover 110 exposes the labeled sticker 330 through the window 115. When the user needs to put a new label in the window 115, he or she removes the mounting plate's tabs 345 from the notches 340, removes the sticker 330, and puts a new labeled sticker therein. Alternatively, the user may put a new sticker on top of the old one. The various components, such as the rear and front face plates and mounting plate, may typically be comprised of a plastic material, but other suitable materials are also possible. The clear film may be comprised of, for example, a clear plastic or a synthetic plastic resin, such as polyethylene terephthalate (PET), polypropylene (PP), polyethylene (PE), polyvinyl chloride (PVC), etc.

The clear film 310 functions as a protective layer to the mounting plate 315 and sticker 325. In other embodiments, however, the mounting plate may be used without the film. The mounting plate may be clear or colored, such as white, black, etc. Alternatively, the sticker may attach to the clear film 310 and the film may include the tabs or other connecting mechanism to the front light switch cover 110. Although a tab and notch connection mechanism is shown, other connection mechanisms are also possible, such as a small screw, a permanently clear window in the front light switch cover 110 that stickers attach to on its rear or front side, etc. While FIGS. 1-4 show an embodiment with a front and rear cover, alternatively, the label concept may be used with a single face plate, like the rear cover 305, that includes the label window, its components, and screws that attach to the wall.

Figure 4:
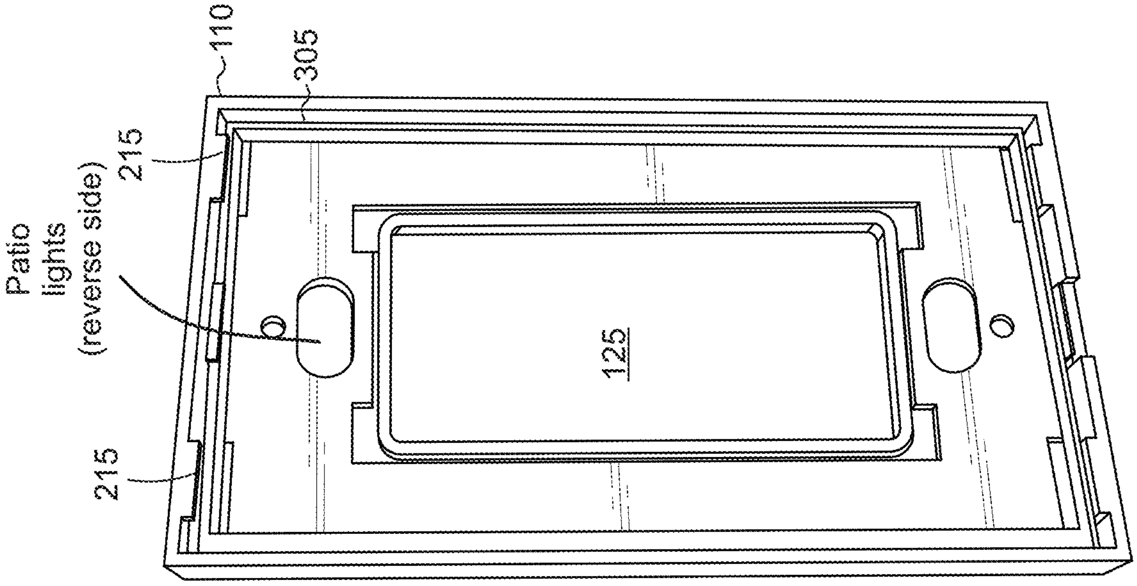
FIG. 4 shows an illustrative representation of a rear side of the assembled light switch cover.

FIG. 4 shows an illustrative representation in which the front light switch cover 110 and rear plate 305 are attached using the tabs 215. The front side of the assembly would show, for example, what was written or printed on the front label, such as "Patio lights." Stickers may come pre-printed with the assembly as a full kit, or users may write their own phrases on the stickers.

Figure 5:
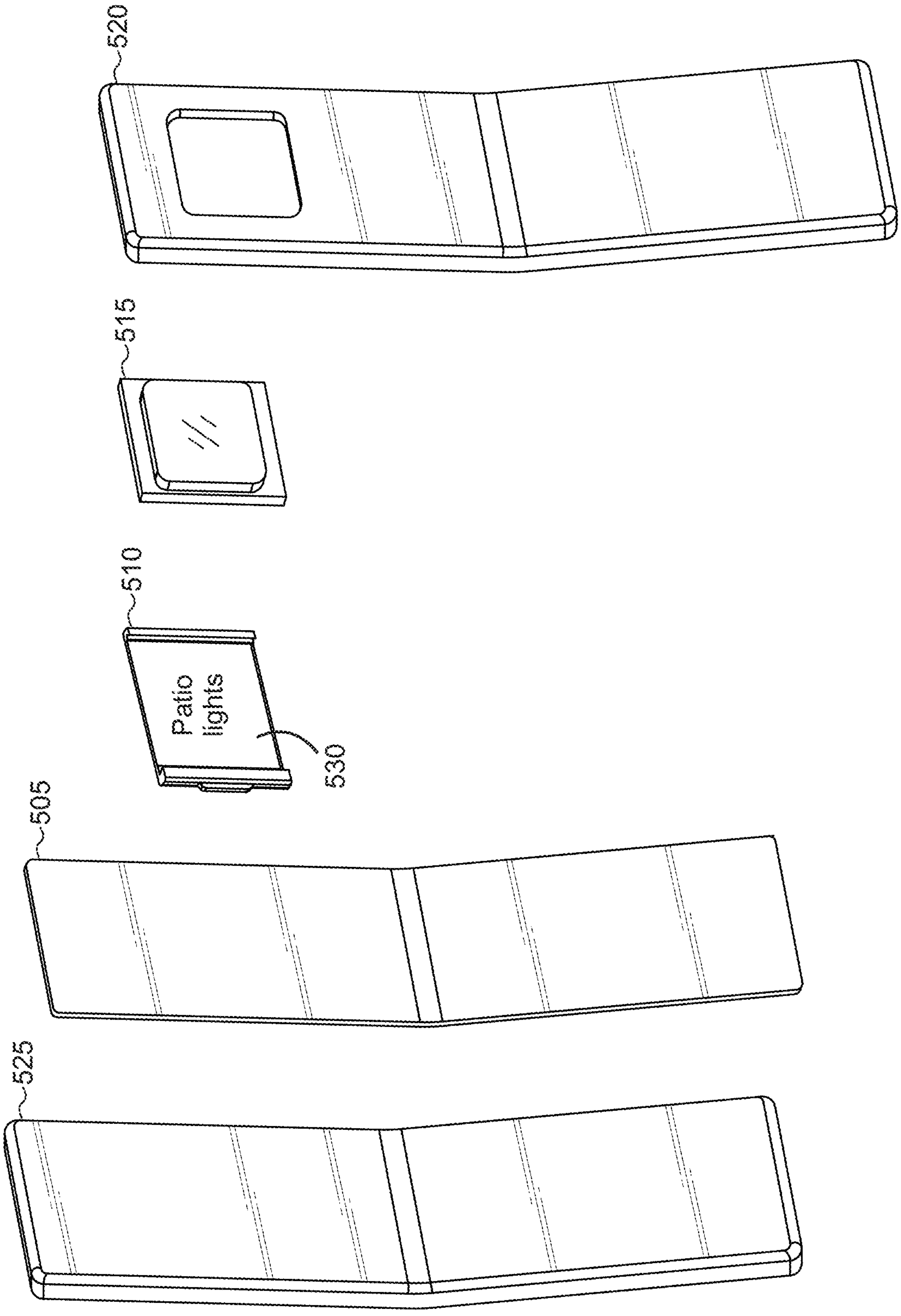
FIG. 5 shows an illustrative representation of an alternative embodiment of a paddle light switch cover with a window.

FIG. 5 shows an illustrative representation in which a paddle switch includes a configuration with a label 510. In this embodiment, a rear side of double-sided tape 505 is attached to a paddle switch 525. As shown, the double-sided tape is sized to correspond to a shape and size of typical paddle switches. A mounting plate 510 is then secured to a front side of the double-sided tape via the tape's adhesive, and the mounting plate is then covered via the film 515 and a front plate 520 covers the entire assembly. A sticker 530 is already attached to the mounting plate 510 in this example. That sticker may be removed or covered with another sticker when the user wishes to change the label. Typically, the user may assemble the mounting plate into a rear indent of the paddle switch, which has a similar configuration as the front light switch over 110 shown in FIG. 3 with the notches 340 within an indent 205 that the mounting plate's tabs 345 press-fit against. Once the mounting plate, sticker, clear film, and front plate are assembled together, the user may attach the entire assembly to the front side of the double-sided tape 505. Should the double-sided tape ever wear and tear, the user can always remove it and put another piece of tape against the paddle switch 525.

Figure 6:
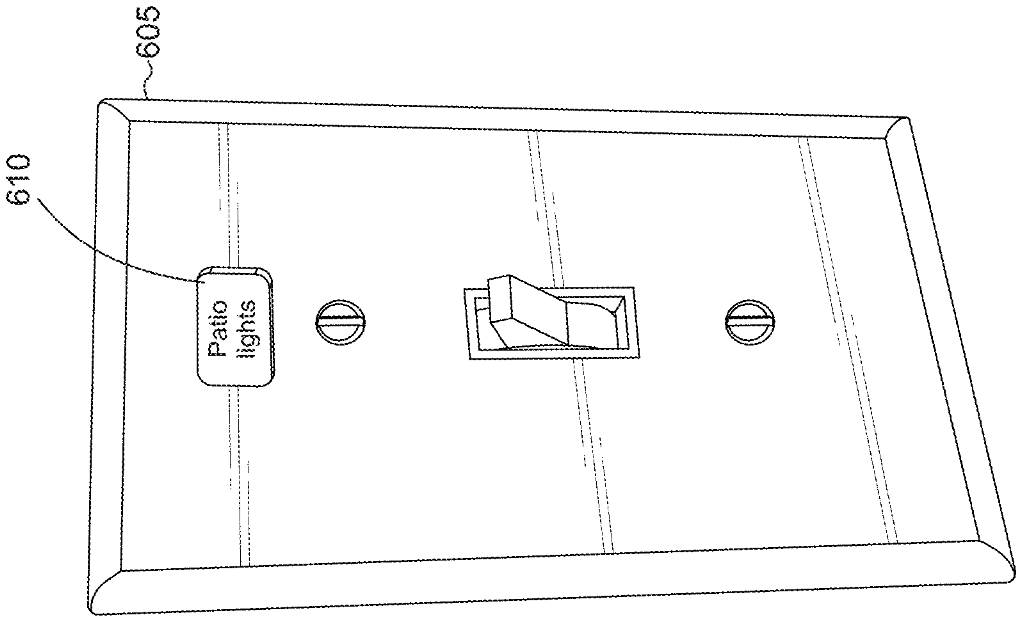
FIG. 6 shows another alternative light switch cover with a window.

FIG. 6 shows an illustrative representation in which the present implementation can be used with various electrical switches, including toggle switches. For example, as explained above, the labeled face plate can be used with a face plate cover 605 that includes screws. The face plate cover here may be configured similarly to the front face plate cover 110 described above, with a mounting plate 315, sticker 325, clear film 310, and indent 205, but without the rear plate since the face plate shown in FIG. 6 functions both as the front and rear plate.

In other implementations, the opening in the face plate may be configured with a display screen, such as an LCD (Liquid Crystal Display) or LED (light emitting diode) display. Given the light's proximity to a power source, an IoT (Internet of Things) implementation can be used. For example, each light switch may be configured with a processor, such as a microcontroller and memory, so the user can transmit signals to change the display screen. The light switch may be configured with network connectivity, such as WiFi, Bluetooth®, NFC (near field communication), etc., so the user can connect to the light switch and change its display screen. In this regard, users may take the opportunity to have more fun with their light switches by being able to control and send messages. The display screen may be relatively small, as shown above, but it may be larger and take up a larger width and length of the light switch so long as the display does not interfere with the switch's movements. This may allow users to make playful messages on the light switches, such as "Have a great day," "Don't leave this on!" "Shut off before bed!" "Emergency Switch!!!" and the like.

Figure 7:
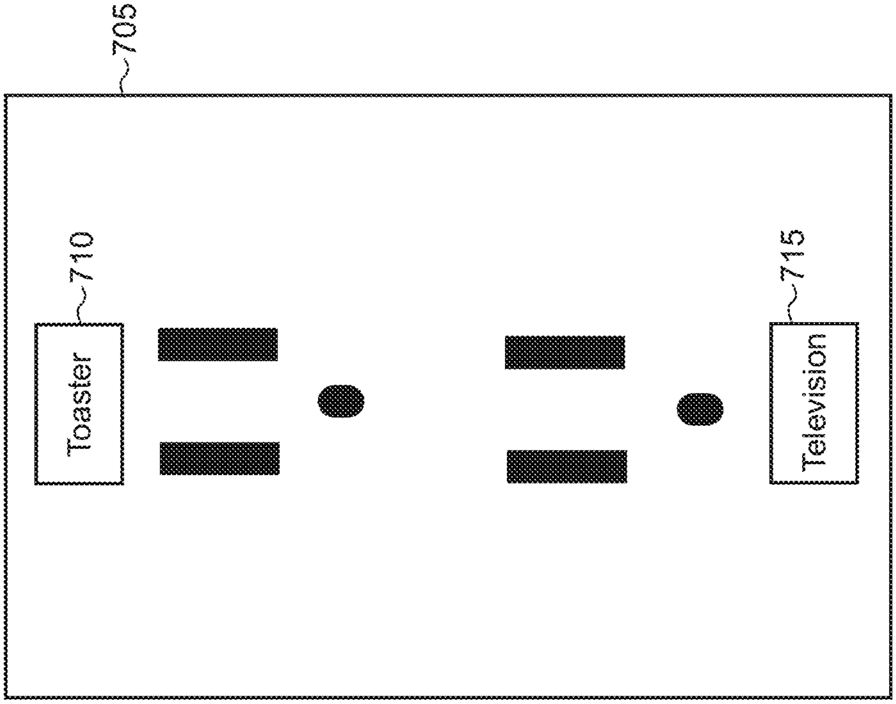
FIG. 7 shows an illustrative representation of an electrical cover with multiple windows.

Larger windows may also be used with the switches shown in FIGS. 1-6 so that additional information can be transmitted to users. For example, perhaps the user can write "switch breaker 4" to convey to the user which switch breaker the socket is controlled by (i.e., the fourth switch breaker down). In various settings, whether personal, industrial, or commercial, such information can support electricians or other workers while providing important safety information or instructions and not sacrificing aesthetics since the window was made for such a purpose. Thus, while light switches are shown and described herein, other electrical switch face plates may also utilize such a product, such as electrical sockets. FIG. 8, for example, shows an illustrative representation in which the user has labeled the specific sockets on the electrical cover 705 for specific uses, as representatively shown by reference numerals 710 and 715. While labels are shown on the top and bottom portions herein, labels may be present at any location on the covers, such as the left side, right side, corners, etc. For example, some switches or face plates may have multiple light switches or sockets, so positioning the windows accordingly may be achieved. The windows shown in FIG. 7 may be configured similarly as described above with respect to FIG. 3, such as with a clear film, indent with notches, sticker, and mounting plate with tabs to facilitate the press-fit mechanism.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An electrical cover, comprising:

an indent on a rear side of the electrical cover, wherein the indent defines an indent surface that is positioned in between a rear side and a front side of the electrical cover, the front side being exposed when the electrical cover is secured to a support structure, and the rear side being opposite the front side;

a clear film that enters the indent surface;

a mounting plate that attaches inside of the electrical cover's indent; and a label that secures to the mounting plate, the label including insignia exposed in a like direction as the front side of the electrical cover, and wherein the label is positioned between the mounting plate and the clear film, wherein the mounting plate includes a fastener that secures to a corresponding fastener within the indent, and wherein the mounting plate's fastener secures the clear film and label within the indent.

2. The electrical cover of claim 1, wherein the fastener on the mounting plate are tabs and the corresponding fastener within the indent are notches, and wherein the mounting plate's tabs engage with the indent's notches.

3. The electrical cover of claim 2, wherein the indent in the electrical cover includes an open window that enables the insignia on the sticker to be exposed from a front side of the electrical cover.

4. The electrical cover of claim 3, wherein the electrical cover includes multiple windows, indents, and mounting plates to label different sockets or switches on the electrical cover.

* * * * *